United States Patent
Wang et al.

(10) Patent No.: US 8,375,378 B2
(45) Date of Patent: Feb. 12, 2013

(54) CIRCUIT FOR UPDATING FIRMWARE OF DISPLAY APPARATUS AND METHOD THEREOF

(75) Inventors: Ching-Tzong Wang, Kaohsiung (TW); Szu-Ping Chen, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 1570 days.

(21) Appl. No.: 11/832,927

(22) Filed: Aug. 2, 2007

(65) Prior Publication Data

US 2008/0034152 A1 Feb. 7, 2008

(30) Foreign Application Priority Data

Aug. 3, 2006 (TW) .................... 95128546 A

(51) Int. Cl.
*G06F 9/44* (2006.01)
(52) U.S. Cl. ............... 717/168; 717/169; 717/170
(58) Field of Classification Search .............. 717/168, 717/169, 170
See application file for complete search history.

(56) References Cited

U.S. PATENT DOCUMENTS

| | | | | |
|---|---|---|---|---|
| 5,809,287 A * | 9/1998 | Stupek et al. | | 703/22 |
| 5,878,256 A * | 3/1999 | Bealkowski et al. | | 713/2 |
| 6,678,741 B1 * | 1/2004 | Northcutt et al. | | 709/248 |
| 6,996,819 B1 * | 2/2006 | Alanis | | 717/173 |
| 7,170,520 B2 * | 1/2007 | Yang | | 345/530 |
| 7,558,797 B2 * | 7/2009 | Li | | 1/1 |
| 7,660,878 B2 * | 2/2010 | Castaldi et al. | | 709/221 |
| 2004/0267891 A1 * | 12/2004 | Hoeye et al. | | 709/206 |
| 2005/0073511 A1 * | 4/2005 | Yang | | 345/204 |
| 2005/0144612 A1 * | 6/2005 | Wang et al. | | 717/168 |
| 2005/0267943 A1 * | 12/2005 | Castaldi et al. | | 709/206 |
| 2006/0218309 A1 * | 9/2006 | Young et al. | | 710/8 |
| 2007/0002347 A1 * | 1/2007 | Lai et al. | | 358/1.9 |
| 2007/0174418 A1 * | 7/2007 | Garcia et al. | | 709/217 |
| 2008/0184151 A1 * | 7/2008 | Agarwal et al. | | 715/772 |

FOREIGN PATENT DOCUMENTS

CN 101414454 4/2009

* cited by examiner

*Primary Examiner* — Phillip H Nguyen

(74) *Attorney, Agent, or Firm* — Birch, Stewart, Kolasch & Birch, LLP

(57) ABSTRACT

The present invention relates to a circuit for updating firmware of a display apparatus and a method thereof. An optional update unit may be used for initializing the updating process. The first firmware information of the first display apparatus is transmitted to the second display apparatus for updating the second firmware information of the second display apparatus. Hence, reliability is enhanced and problems of incompatibility will not occur. In addition, no extra burning devices will be necessary, thus reducing extra cost.

18 Claims, 5 Drawing Sheets

CIRCUIT FOR UPDATING FIRMWARE OF DISPLAY APPARATUS AND METHOD THEREOF

FIELD OF THE INVENTION

The present invention relates to a display apparatus, and particularly to a circuit for updating firmware of a display apparatus and a method thereof.

BACKGROUND OF THE INVENTION

In a typical display apparatus, a read-only memory is applied for storing basic and relevant parameter information used for configuration or initialization. After a display apparatus leaves the factory and reaches a common user, the user will then have to bring the display apparatus back to the vendor for firmware updating if necessary, which is considerably inconvenient.

There are a few methods to write firmware information into a display apparatus, which include the condition when the display apparatus is still in the factory or when a sold product requires firmware updating. The following are some examples.

In the first example, a terminal that is external to the display apparatus is reserved in advance. The terminal is to be coupled to a signal line in order to receive signals of a computer that resides externally. The drawback of this method is that an extra terminal and an extra transmission line to transmit signals are required, thus increasing design complexity and cost. In addition, the computer video card Display Data Channel (DDC) which is applied for burning firmware information directly into the display apparatus, necessitates vendors to provide burning programs that must be compatible with numerous versions of computer hardware and operation systems. Due to the fact that a computer is an open platform system that requires compatibility among burning programs, computers, video cards, and display apparatuses, such prerequisites will make the development and maintenance of burning programs very difficult.

In another example, a specific device (e.g. an interface card) can be used as the connection to the display apparatus. Firmware information is directly burned into the display apparatus in this fashion such that the detachment of the microprocessor from the display apparatus is no longer necessary. However, vendors and corresponding maintenance sites will have to manufacture and maintain such burning devices.

In a third example, chassis of the display apparatus is taken apart such that the microprocessor written with firmware information can be detached from the display apparatus. A burner is used for burning updated firmware information into the microprocessor, and the microprocessor is then remounted back into the display apparatus. This is extremely inconvenient for general users, for they will have to acquire the updated firmware information beforehand, despite the fact that they do not generally have any burning devices for the burning process. Moreover, the detachment or installation of the display apparatus and the microprocessor as described above may cause unpredictable damages or hidden risks. It is believed that all methods aforementioned may cause inconvenience and a waste of time and cost.

Consequently, a novel circuit and a method for updating firmware of a display apparatus are necessary to manage problems described above. The instant invention to be proposed will not only solve compatibility problems during computer updating, but also reduce any extra cost, i.e. by avoiding the use of burners or specific devices. In addition, detaching the microprocessor from the display apparatus will no longer be necessary, which thereby saves time and effort.

SUMMARY

The purpose of the present invention is to provide a circuit and a method for updating firmware of a display apparatus. A first firmware information is written into a second storage unit of a second display apparatus using a first microprocessor unit of a first display apparatus, in order to update firmware information of the second display apparatus. The closed-type circuit enhances the reliability and solves the problem of incompatibility.

Another purpose of the present invention is to provide a circuit and a method for updating firmware of a display apparatus, such that redundant burning devices that require extra cost are no longer necessary.

Yet another purpose of the present invention is to provide a circuit and a method for updating firmware of a display apparatus, such that Video Graphics Array (VGA) or Digital Visual Interface (DVI) of the display apparatus can be used as the transmission interface for updating firmware information. Hence, an extra terminal is no longer necessary for updating, which also reduces extra cost.

A circuit for updating firmware of a display apparatus according to the present invention may include a first display apparatus and a second display apparatus, wherein the first display apparatus includes a first microprocessor unit and a first storage unit for storing a first firmware information, and the second display apparatus includes a second microprocessor unit and a second storage unit for storing a second firmware information. An update unit may initialize the updating procedure. The first microprocessor unit reads the first firmware information in the first storage unit, and transmits the first firmware information to the second microprocessor unit of the second display apparatus. The second microprocessor unit writes the first firmware information into the second storage unit in order to update the second firmware information.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1:
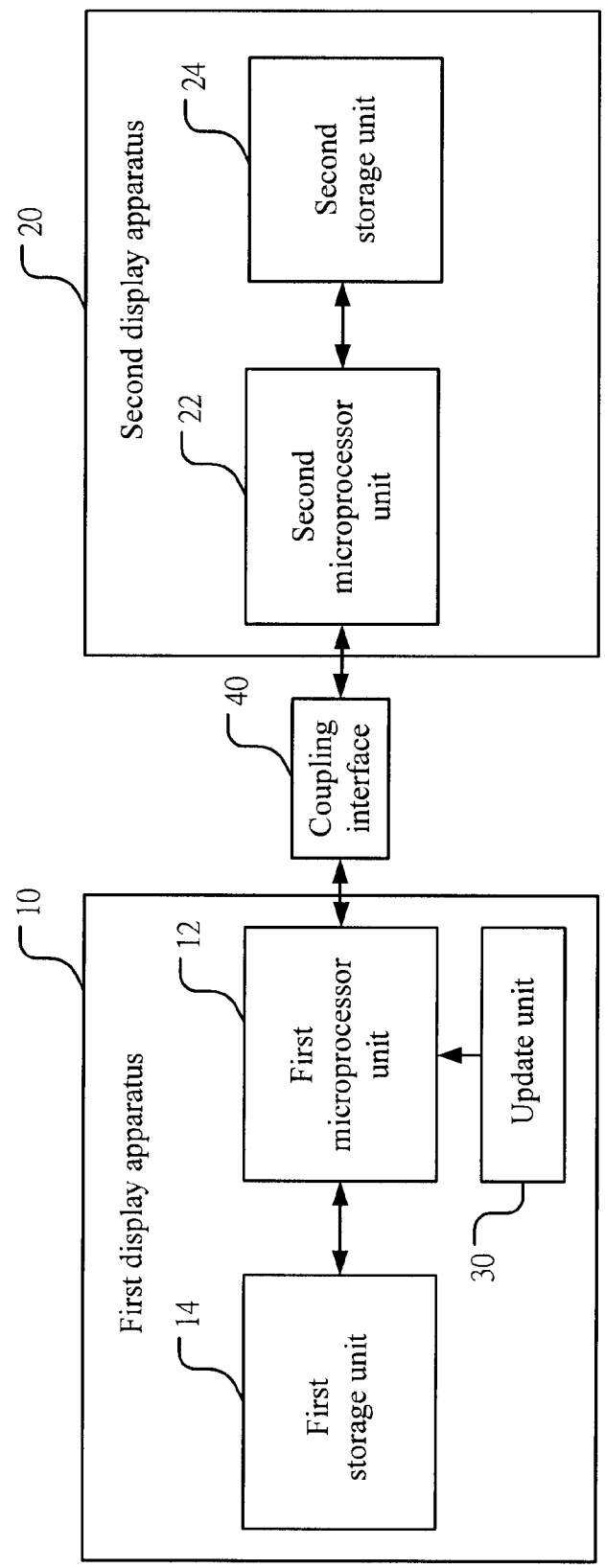
FIG. 1 is a block diagram of a circuit for updating firmware of a display apparatus according to a preferred embodiment of the present invention.

FIG. 1 is a block diagram of a circuit for updating firmware of a display apparatus illustrated according to a preferred embodiment of the present invention. According to the present invention, a maintenance site may provide updating service of older or defected versions of firmware information by installing a new version of firmware information into the display apparatus. As shown in the figure, the circuit for updating firmware of a display apparatus includes a first display apparatus 10 and a second display apparatus 20, wherein the first display apparatus 10 is coupled with the second display apparatus 20. The first display apparatus 10 includes a first microprocessor unit 12, a first storage unit 14, and an update unit 30. The second display unit 20 includes a second microprocessor unit 22 and a second storage unit 24. The first storage unit 14 stores a first firmware information, while the second storage unit 24 stores a second firmware information. The first microprocessor unit 12 and the second microprocessor unit 22 are coupled to the first storage unit 14 and the second storage unit 24 respectively, in order to write firmware information into or to read the firmware information from the storage units 14, 24. In addition, the first microprocessor unit 12 and the second microprocessor unit 24 possess In-System Programming (ISP) function, such that updating firmware information from the first display apparatus 10 to the second display apparatus 20 can be processed directly without the need of detaching the first microprocessor unit 12 and the second microprocessor unit 22 from the first display apparatus 10 and the second display apparatus 20, respectively.

Furthermore, the update unit 30 may reside in the first display apparatus 10 in order to allow the first microprocessor unit 12 in the first display apparatus 10 to read the first firmware information, and to transmit the first firmware information to the second display apparatus 20. The first firmware information may be written into the second storage unit 24 of the second display unit 20 by the second microprocessor unit 22 of the second display apparatus 20 when updating the second firmware information.

Figure 2:
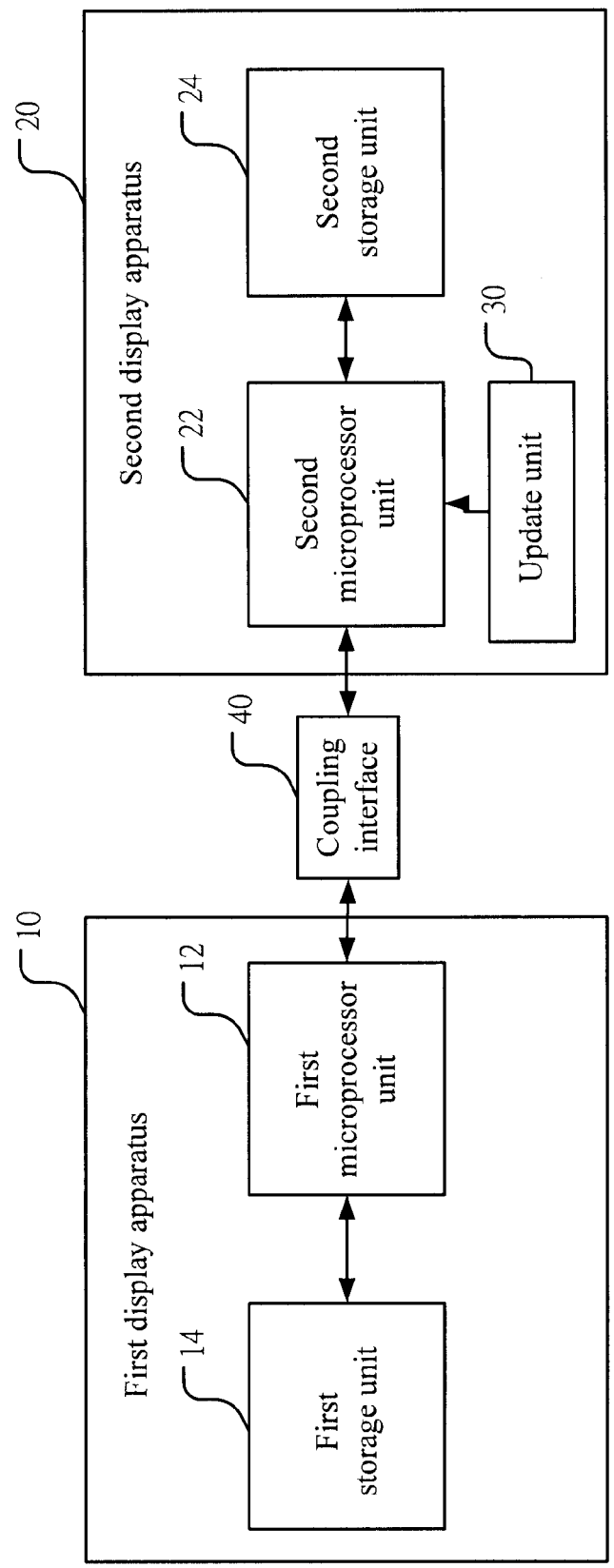
FIG. 2 is a block diagram of a circuit for updating firmware of a display apparatus according to a preferred embodiment of the present invention.

FIG. 2 is a block diagram of a circuit for updating firmware of a display apparatus illustrated according to a preferred embodiment of the present invention. As shown in the figure, the update unit 30 illustrated according to the present embodiment resides in the second display apparatus 20. The update unit 30 enables the second microprocessor unit 22 of the second display apparatus 20 to transmit a request signal to the first display apparatus 10. After the first microprocessor unit 12 of the first display apparatus 10 receives the request signal, the first firmware information in the first storage unit 14 is read and transmitted to the second microprocessor unit 22 of the second display apparatus 20. The second microprocessor unit 22 thereby updates the second firmware information in the second storage unit 24 according to the received first firmware information. The update unit 30 can be an update key or a combination key composed of a plurality of keys for preventing errors involving update initialization. The proposed update unit 30 can also be controlled through an On-Screen Display (OSD).

Furthermore, when the update unit 30 initializes the updating procedure, the microprocessor unit(s) 10, 20 may determine whether the first firmware information is a new version or an old version. When the first firmware information is determined as the new version, the first firmware information is transmitted from the first display apparatus 10 to the second display apparatus 20 in order to update the second firmware information of the second display apparatus 20. Likewise, when the second firmware information is the new version, the second firmware information is transmitted from the second display apparatus 20 to the first display apparatus 10 in order to update the first firmware information of the first display apparatus 10.

The first display apparatus 10 and the second display apparatus 20 can be mutually coupled by a coupling interface 40 (as shown in FIG. 1 and FIG. 2). The coupling interface 40 can be VGA, DVI, or High-Definition Multimedia Interface (HDMI), and may include DDC for transmitting firmware information. The DDC includes a Signal Data (SDA) and a Signal Clock (SCL), wherein the SDA is used for transmitting internal data, such as model type, name, or resolution of the display apparatus, while SCL is the clock pulse that is synchronous with the SDA. Both SDA and SCL comply with the I$^2$C communication protocol.

The trend of a system-on-chip architecture suggests that the first storage unit 14 and the update unit 30 can be jointly or separately included in the first microprocessor unit 12 that is described in the embodiments above, achieving the purpose of system minimization by miniaturizing the whole circuit. Similarly, the second storage unit 24 and the update unit 30 can be jointly or separately included in the second microprocessor unit 22.

Figure 3:
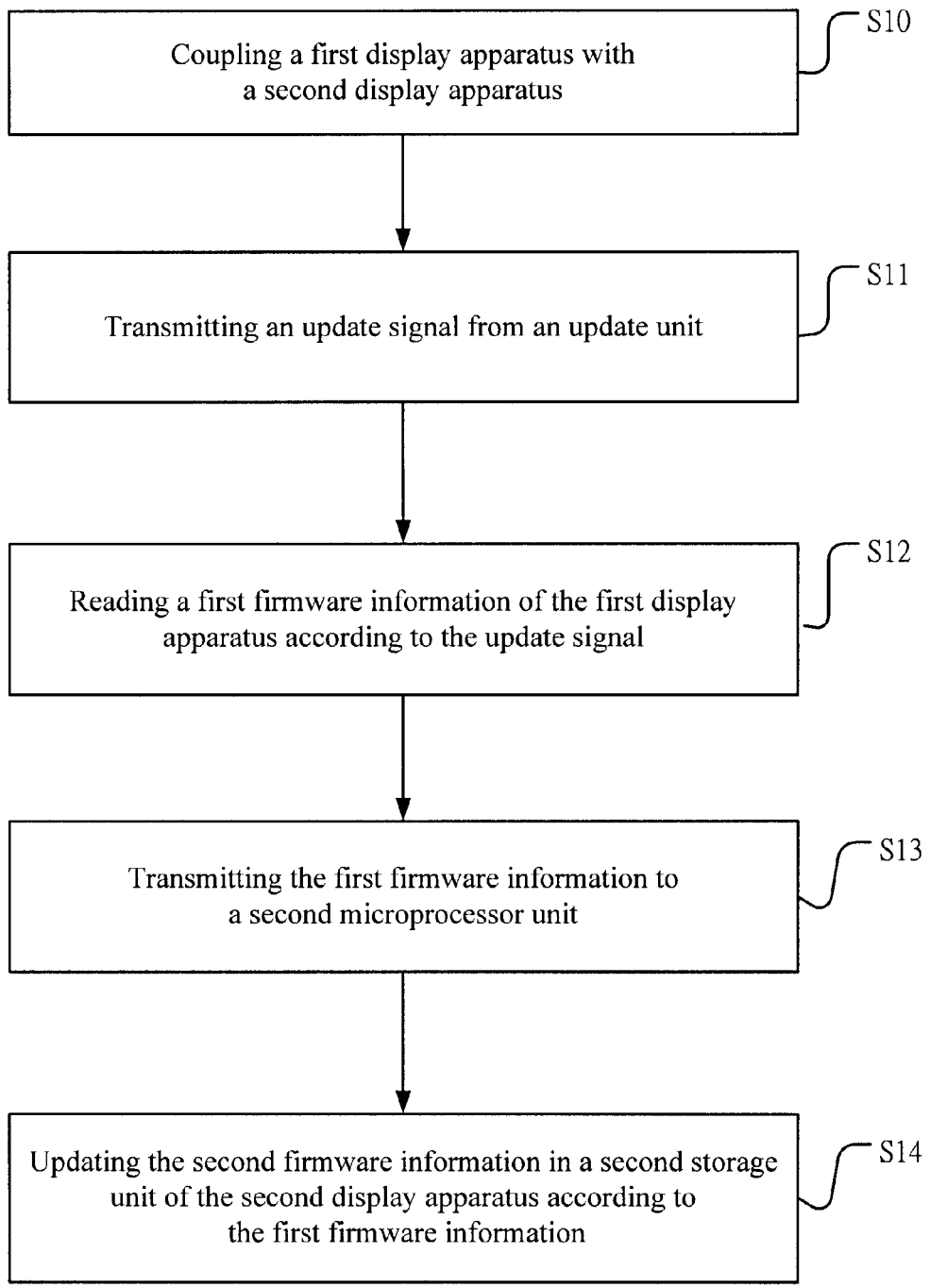
FIG. 3 is a flowchart of a method for updating firmware of a display apparatus according to a preferred embodiment of the present invention.

FIG. 3 is a flowchart of a method for updating firmware of a display apparatus illustrated according to a preferred embodiment of the present invention. As shown in FIG. 3 with FIG. 1 referenced as well, the step S10 executes the process of coupling a first display apparatus 10 with a second display apparatus 20. Then, in step S11, an update signal is transmitted from an update unit 30 (the update unit 30 is optional and may reside in any part of the hardware circuits) to a first microprocessor unit 12 of the first display apparatus 10. Next, in step S12, a first firmware information is read from a first storage unit 14 of the first display apparatus 10 in reference to the update signal. Thereafter in step S13, the first firmware information is transmitted to a second microprocessor unit 22 of the second display apparatus 20. Then, step S14 executes the updating process of a second firmware information in the second storage unit 24 according to the first firmware information.

Figure 4:
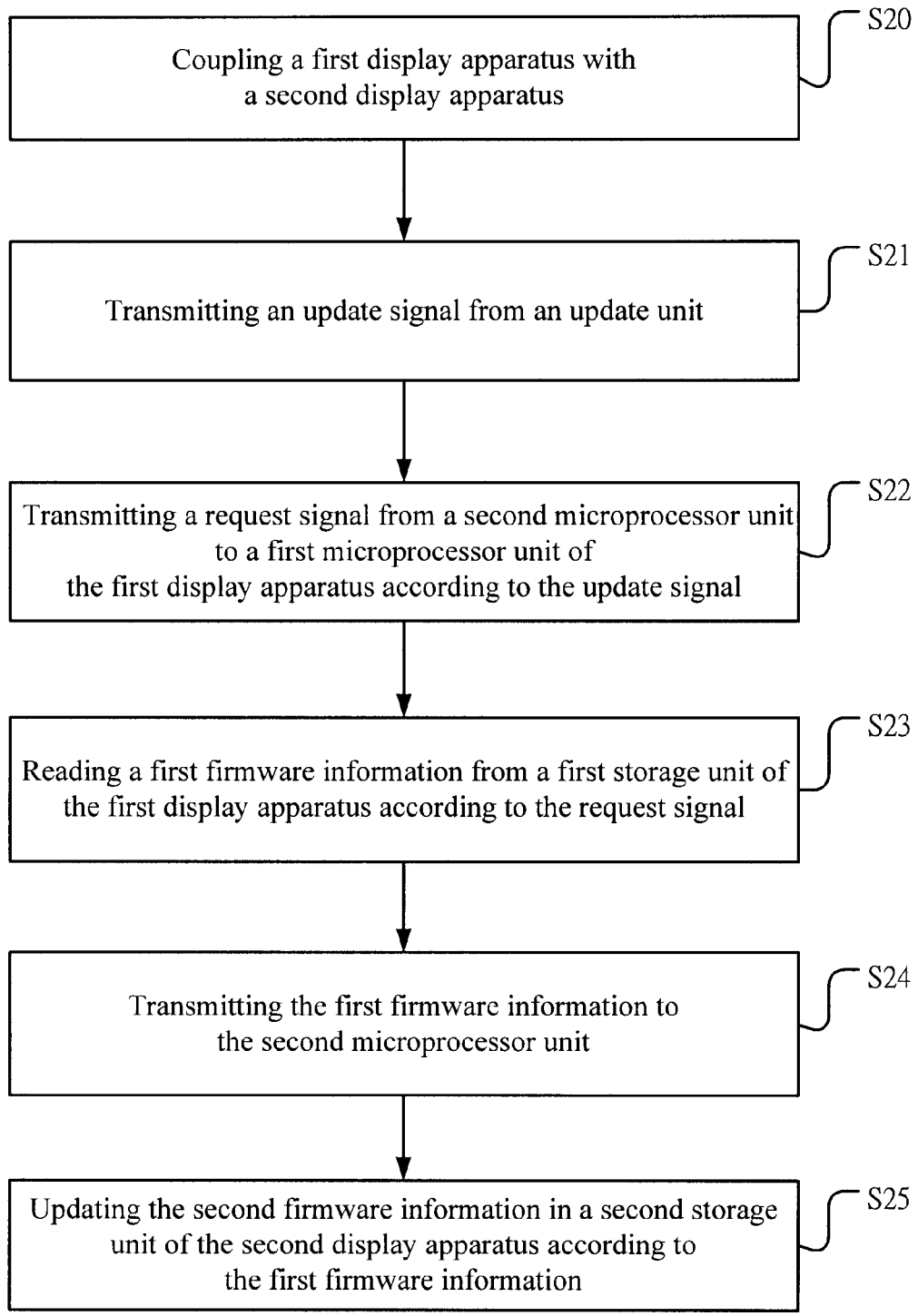
FIG. 4 is a flowchart of a method for updating firmware of a display apparatus according to a preferred embodiment of the present invention.

FIG. 4 is a flowchart of a method for updating firmware of a display apparatus illustrated according to a preferred embodiment of the present invention. As shown in FIG. 4 with FIG. 2 referenced as well, the step S20 executes the process of coupling a first display apparatus 10 with a second display apparatus 20. Then, in step S21, an update signal is transmitted from an update unit 30 (the update unit 30 is optional and may reside in any part of the hardware circuits) to the second display apparatus 20. Next, in step S22, a request signal is transmitted from a second microprocessor unit 22 of the second display apparatus 20 to a first microprocessor unit 12 of the first display apparatus 10, which is initiated by the update signal. Afterwards, to respond the request signal, step S23 is executed such that a first firmware information is read from a first storage unit 14 of the first display apparatus 10. Thereafter, step S24 is executed to transmit the first firmware information to the second microprocessor unit 22. Then, step S25 executes the updating process of a second firmware information in the second storage unit 24 of the second display apparatus 20 according to the first firmware information.

Figure 5:
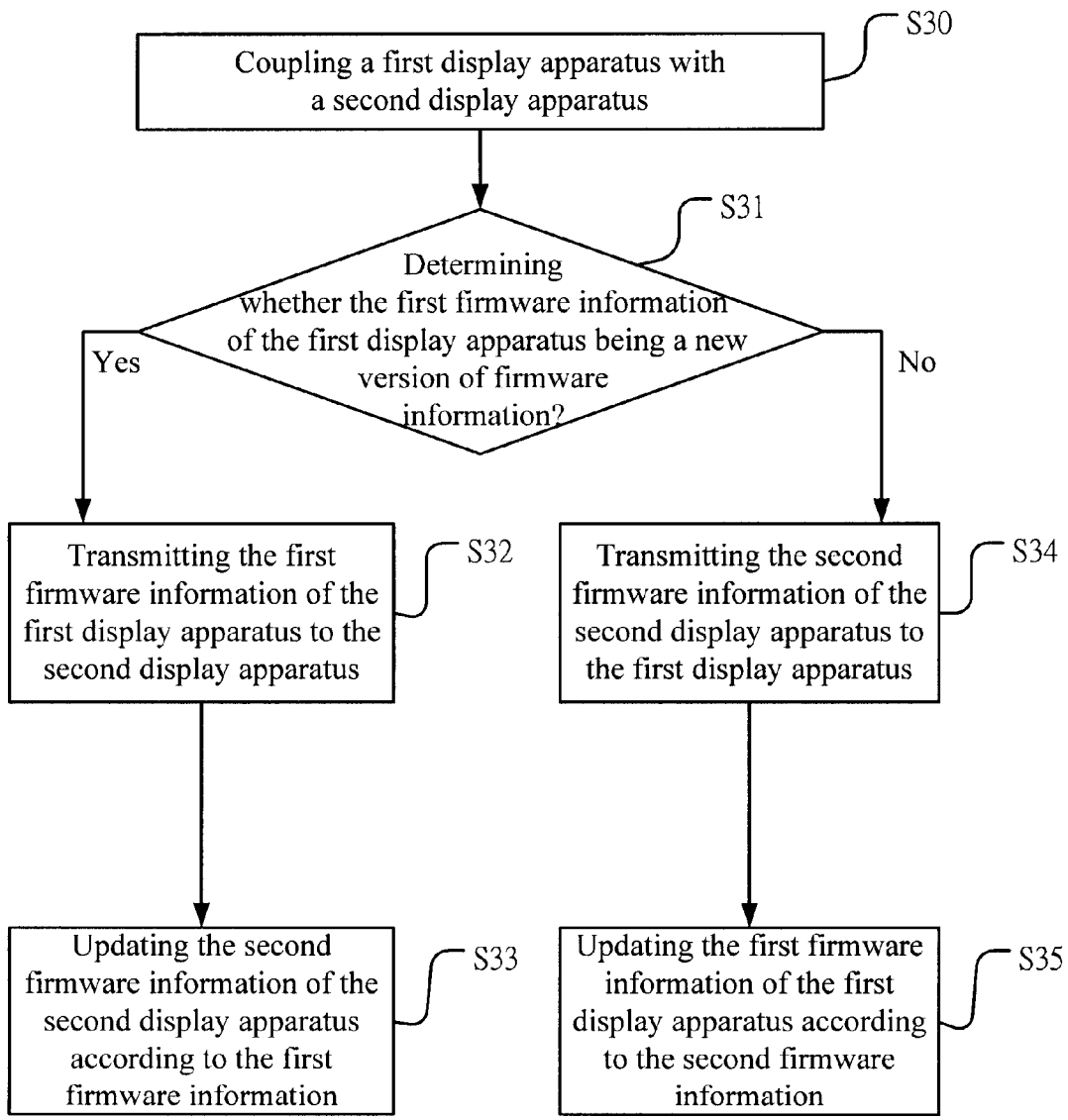
FIG. 5 is a flowchart of a method for updating firmware of a display apparatus according to a preferred embodiment of the present invention.

FIG. 5 is a flowchart of a method for updating firmware of a display apparatus illustrated according to a preferred embodiment of the present invention. As shown in the figure, the difference between the present embodiment and the embodiments demonstrated in FIG. 3 and FIG. 4 is that step S31 determines whether a first firmware information of the first display apparatus 10 is a new version or an old version of firmware information. When the first firmware information is the new version of firmware information, step S32 is executed in order to transmit the first firmware information to the second display apparatus 20 from the first display apparatus 10. Then step S33 is executed to update the second firmware information of the second display apparatus 20 according to the first firmware information. When the first firmware information is the old version of firmware information, step S34 is then executed in order to transmit the second firmware information of the second display apparatus 20 to the first display apparatus 10. Next, the step S35 is executed to update the first firmware information of the first display apparatus 10 according to the second firmware information of the second display apparatus 20.

To sum up, the circuit for updating firmware of a display apparatus according to the present invention includes a first display apparatus, a second display apparatus, and an update unit, wherein the first display apparatus includes a first microprocessor unit and a first storage unit; the second display apparatus includes a second microprocessor unit and a second storage unit. An optional update unit may initialize the updating procedure. When a first firmware information is a new version of firmware information, the first firmware information is read from the first storage unit and is transmitted to the second display apparatus for updating a second firmware information of the second display apparatus. After the update unit has initialized the updating process, it is also possible to determine whether the first or the second firmware information is the newer version of firmware information. Hence, the older version of firmware information is always updated by the newer version of firmware information.

Because the embodiments described above are circuits developed specifically for updating firmware information of a display apparatus by another display apparatus, it is by nature a closed-type system. The closed-type system possesses high reliability and eliminates problems regarding compatibility. Therefore, computers equipped with extra burning devices are no longer necessary, which in turn reduces extra cost. In addition, because VGA or DVI is used as the coupling interface of transmission between two corresponding display apparatuses for updating firmware information, extra terminals on the display apparatuses will no longer be necessary. However, it is to be emphasized herein that the coupling interface is not limited to VGA or DVI. All corresponding interfaces can apply.

Accordingly, the present invention conforms to the legal requirements owing to its novelty, unobviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A method for updating firmware of a display apparatus, comprising the steps of:
    coupling a first display apparatus with a second display apparatus via an interface having a Display Data Channel, wherein the first display apparatus operates by executing a first firmware, and the second display apparatus operates by executing a second firmware;
    reading a first firmware of the first display apparatus according to an update signal;
    transmitting the first firmware to the second display apparatus via the Display Data Channel of the interface; and
    updating a second firmware of the second display apparatus according to the first firmware.

2. The method of claim 1, wherein the function of In-System Programming is applied for writing the first firmware into the second display apparatus.

3. The method of claim 1, wherein the update signal informs the second display apparatus to transmit a request signal to the first display apparatus, and enables the first display apparatus to read the first firmware of the first display apparatus.

4. The method of claim 3, wherein the request signal is transmitted from the second display apparatus to the first display apparatus via the Display Data Channel.

5. A method for updating firmware of a display apparatus, comprising the steps of:
    coupling a first display apparatus with a second display apparatus, wherein the first display apparatus operates by executing a first firmware, and the second display apparatus operates by executing a second firmware;
    determining whether a first firmware of the first display apparatus is a new version or an old version of firmware;
    transmitting the first firmware from the first display apparatus to the second display apparatus, and updating a second firmware of the second display apparatus according to the first firmware if the first firmware of the first display apparatus is determined as the new version of firmware; and
    transmitting the second firmware to the first display apparatus, and updating the first firmware according to the second firmware if the first firmware of the first display apparatus is determined as the old version of firmware.

6. The method of claim 5, wherein the first firmware, the second firmware or both are transmitted between the first display apparatus and the second display apparatus via a Display Data Channel of an interface between the first display apparatus and the second display apparatus.

7. The method of claim 5, wherein the function of In-System Programming is applied for writing the first firmware into the second display apparatus, or writing the second firmware into the first display apparatus.

8. A circuit for updating firmware of a display apparatus, comprising:
    a first storage unit, residing in a first display apparatus for storing a first firmware, wherein the first display apparatus operates by executing the first firmware;
    a second storage unit, residing in a second display apparatus for storing a second firmware, wherein the second display apparatus operates by executing the second firmware;
    an update unit, used for producing an update signal to enable writing the first firmware into the second storage unit or to enable writing the second firmware into the first storage unit;
    a first microprocessor unit, residing in the first display apparatus and is coupled to the first storage unit, used for controlling data reading and writing of the first storage unit;
    a second microprocessor unit, residing in the second display apparatus and is coupled to the second storage unit, used for controlling data reading and writing of the second storage unit; and
    a coupling interface, for coupling the first microprocessor unit with the second microprocessor unit,
    wherein the first microprocessor unit determines whether the first firmware is a new version or an old version of firmware, and when it is determined that the first firmware is the new version of firmware, the first microprocessor unit transmits the first firmware from the first display apparatus to the second display apparatus via the coupling interface, and the second microprocessor unit replaces the second firmware stored in the second storage unit with the first firmware.

9. The circuit of claim 8, wherein the update unit is coupled to the first microprocessor unit, and the first microprocessor unit writes the second firmware into the first storage unit according to the update signal produced by the update unit when the first microprocessor unit determines that the first firmware is the old version of firmware.

10. The circuit of claim 8, wherein the update unit is coupled to the second microprocessor unit, and the second microprocessor unit writes the first firmware into the second storage unit according to the update signal produced by the update unit when the first microprocessor unit determines that the first firmware is the new version of firmware.

11. The circuit of claim 10, wherein the second microprocessor unit transmits a request signal to the first microprocessor unit according to the update signal produced by the update unit, and enables the first microprocessor unit to read the first firmware and to transmit the first firmware to the second microprocessor unit in order to write into the second storage unit.

12. The circuit of claim 8, wherein the update unit is coupled to the first microprocessor unit, and the first microprocessor unit reads the first firmware according to the update signal produced by the update unit, and transmits the first firmware to the second microprocessor unit in order to write into the second storage unit.

13. The circuit of claim 8, wherein the first microprocessor unit, the second microprocessor unit or both have In-System Programming function.

14. The circuit of claim 8, wherein the first microprocessor unit comprises the first storage unit, the update unit or both.

15. The circuit of claim 8, wherein the second microprocessor unit comprises the second storage unit, the update unit or both.

16. The circuit of claim 8, wherein the update unit is an update key, a combination key, an On-Screen Display control or combinations thereof.

17. The circuit of claim 8, wherein the coupling interface is an interface of Video Graphics Array, Digital Visual Interface, High-Definition Multimedia Interface or combinations thereof.

18. The circuit of claim 8, wherein the coupling interface includes a Display Data Channel and the new version of firmware is transmitted via the Display Data Channel.

* * * * *